(12) United States Patent
Manders et al.

(10) Patent No.: US 9,333,839 B2
(45) Date of Patent: May 10, 2016

(54) DRIVE MECHANISM AND OPEN ROOF CONSTRUCTION PROVIDED THEREWITH

(71) Applicant: Inalfa Roof Systems Group B.V., Venray (NL)

(72) Inventors: Peter Christiaan Leonardus Johannes Manders, Horst (NL); Suyanto Teri Wahiyu Ten-Jet-Foei, Nijmegen (NL)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 14/567,529

(22) Filed: Dec. 11, 2014

(65) Prior Publication Data

US 2015/0165882 A1    Jun. 18, 2015

(30) Foreign Application Priority Data

Dec. 16, 2013   (EP) .................................... 13197349

(51) Int. Cl.
*B60J 7/02* (2006.01)
*B60J 7/043* (2006.01)

(52) U.S. Cl.
CPC ................ *B60J 7/0435* (2013.01); *B60J 7/024* (2013.01)

(58) Field of Classification Search
CPC ......... B60J 7/0435; B60J 7/057; B60J 7/0573
USPC .................. 296/216.02–216.05, 220.01, 223
See application file for complete search history.

(56) References Cited

U.S. PATENT DOCUMENTS

| 6,547,319 | B1 * | 4/2003 | Huyer ................... | B60J 7/0435 296/216.03 |
| 6,631,944 | B1 | 10/2003 | Nellen et al. | |
| 6,682,134 | B2 * | 1/2004 | De Gaillard .......... | B60J 7/0435 296/216.03 |
| 2012/0074736 | A1 | 3/2012 | Katsura | |
| 2013/0161983 | A1 | 6/2013 | Geurts et al. | |

FOREIGN PATENT DOCUMENTS

| EP | 1741588 A1 | 1/2007 |
| EP | 2436545 A1 | 4/2012 |
| EP | 2607125 A1 | 6/2013 |

OTHER PUBLICATIONS

European Search Report mailed Aug. 20, 2014 for corresponding European Application No. 13197349.7, filed Dec. 16, 2013.

\* cited by examiner

*Primary Examiner* — Dennis H Pedder
(74) *Attorney, Agent, or Firm* — Steven M. Koehler; Westman, Champlin & Koehler, P.A.

(57) ABSTRACT

A drive mechanism for an open roof construction includes a stationary guide part defining a first guide channel, a bracket having a forward end and a rearward end. The forward end includes a guide shoe cooperating with the first guide channel. A lifting unit cooperates with the rearward end of the bracket to lift/lower said rearward end and slide the bracket relative to the lifting unit. A driven slide moves relative to the stationary guide part and is configured to move the guide shoe along the first guide channel and is further configured to lift/lower the rearward end of the bracket. A panel carrier is supported by the bracket and slides in a direction substantially corresponding with the direction of the sliding movement of the bracket. The driven slide is configured to cause the sliding movement of a panel carrier relative to the bracket.

10 Claims, 10 Drawing Sheets

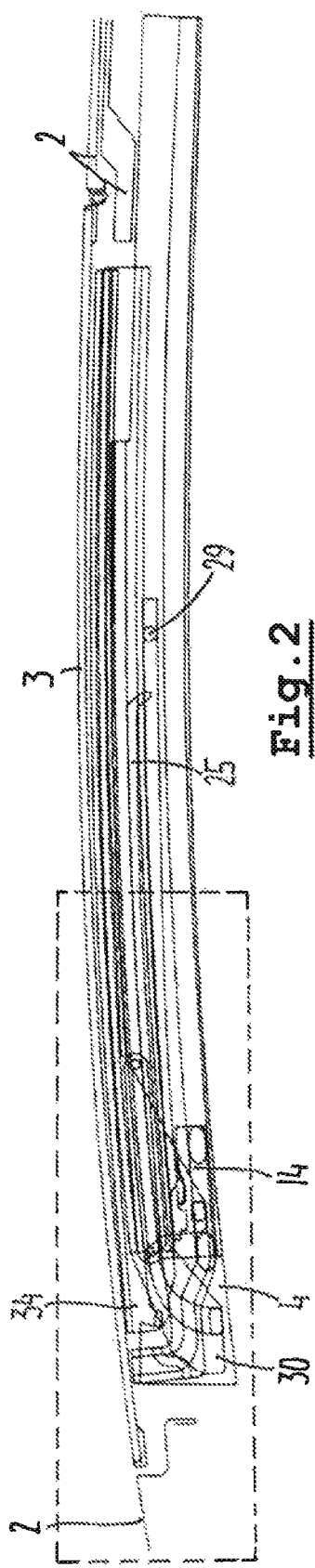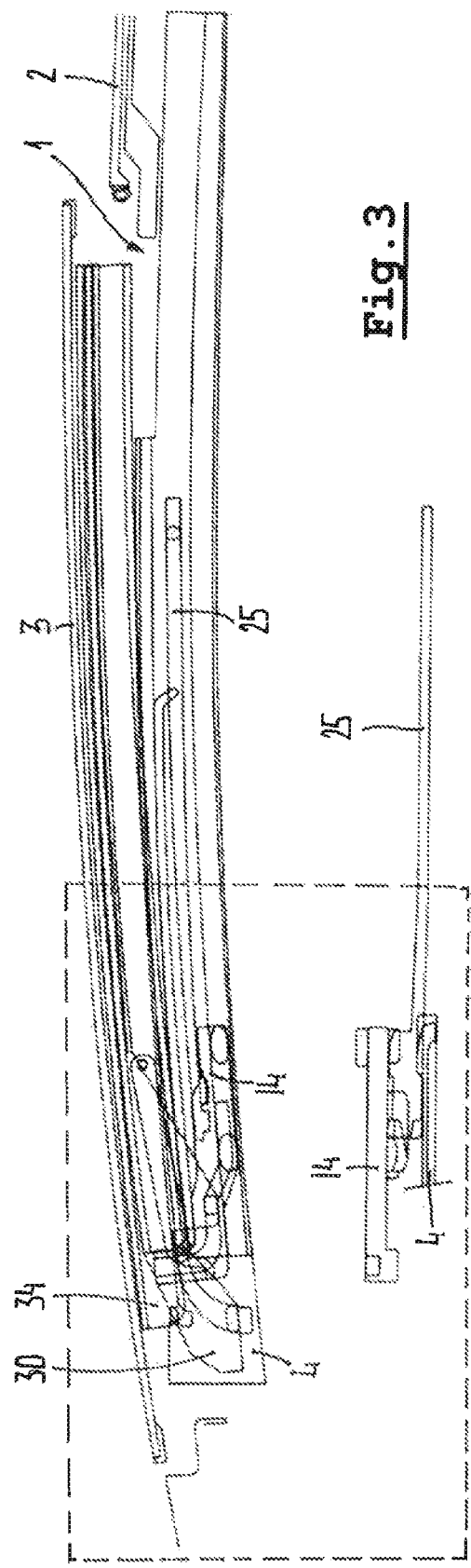

DRIVE MECHANISM AND OPEN ROOF CONSTRUCTION PROVIDED THEREWITH

BACKGROUND

The discussion below is merely provided for general background information and is not intended to be used as an aid in determining the scope of the claimed subject matter.

Aspects of the invention relate to a drive mechanism for an open roof construction for a vehicle, comprising a stationary guide part defining a first guide channel, a bracket having a forward end and a rearward end, wherein the forward end of the bracket is provided with a guide shoe cooperating with the first guide channel in a manner that the bracket can slide and rotate relative to the stationary guide part, further comprising a lifting unit positioned at a stationary position for cooperation with the rearward end of the bracket in a manner to lift or lower said rearward end and to allow a sliding movement of the bracket relative to the lifting unit, and further comprising a driven slide which by a drive is movable in a moving direction relative to the stationary guide part and which at one hand is adapted for moving the guide shoe of the bracket along the first guide channel and which at the other hand is adapted for driving the lifting unit for lifting and lowering the rearward end of the bracket.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

In accordance with an aspect of the present invention, the drive mechanism further comprises a panel carrier which is supported by the bracket and which can carry out a sliding movement relative thereto in a direction substantially corresponding with the direction of the sliding movement of the bracket relative to the stationary guide part. The driven slide is further configured to cause the sliding movement of the panel carrier relative to the bracket.

A drive mechanism is provided in which not only the bracket can carry out a sliding movement with respect to the stationary guide part, but in which an additional panel carrier is provided (which, as its name suggests, may carry a panel, such as a roof panel) which is capable of a sliding movement relative to the bracket. The total resulting movement of panel carrier (and of any part, such as a roof panel, connected thereto) is the sum of both sliding movements. This allows maintaining a minimum distance between the guide shoe and the lifting unit needed for stability while increasing the hands-through opening. It even appears possible to combine a larger handsthrough opening with an increase of the stability by increasing the distance between the guide shoe and the lifting unit in the extreme open position of the driving mechanism (for example an increase of the so-called base length from 30% to 50%).

The use of the driven slide for also causing the sliding movement of the panel carrier with respect to the bracket keeps the complexity of the driving mechanism at a minimum because said driven slide already is present and the movement thereof in essence will not change (apart from a possible increase of the distance over which the driven slide is moved by the drive means).

It is noted that with respect to the present description the reference to the stationary guide part should not be understood as limited to a single stationary guide part. Although it is possible that a single stationary guide part can fulfil all the functions (and can comprise all the components) described here with respect to such a stationary guide part, it is also conceivable that some of these functions are fulfilled by one or a number of other, stationary, parts of the vehicle.

Further it is noted that throughout this description the described cooperation between guiding members such as curves or channels provided on a first component or part, and guided members such as guide shoes or pins on a second component or part, also encompasses the provision of such guiding members on the second component or part and the provision of the guided members on the first component or part.

In one embodiment of the drive mechanism, the panel carrier is provided with a carrier drive pin, and wherein the driven slide comprises a first guide curve for cooperation with the carrier drive pin. As a result, the cooperation between the driven slide and the panel carrier can be realised in a simple, yet reliable manner.

Then, in a further embodiment, the first guide curve of the driven slide comprises at least a sloping curve part sloping relative to the direction of the sliding movement of the panel carrier and at least an orthogonal curve part extending substantially orthogonally to the direction of the sliding movement of the panel carrier, whereas the first guide channel comprises a sloping channel part and a longitudinal channel part extending substantially in the moving direction of the driven slide, wherein the arrangement is such that when the carrier drive pin moves along the sloping curve part, the guide shoe moves along the sloping channel part and when the guide shoe has reached the longitudinal channel part, the carrier drive pin has reached the orthogonal curve part.

This embodiment assures that the initial locked position of the panel carrier in which the first locking pin engages the first locking opening (generally a position in which the open roof construction assumes a completely closed position) is changed into a position allowing to move the panel carrier towards an open position while at the same time the bracket moves along therewith. When the guide shoe of the bracket has reached the longitudinal channel part, the orthogonal curve part restrains the carrier drive pin such that it moves along with the driven slide while the guide shoe moves along the longitudinal channel part.

In such an embodiment it further is possible that the panel carrier is provided with a first locking pin and wherein the stationary guide part is provided with a first locking opening with which the first locking pin is in a locking engagement in a starting position of the drive mechanism in which the driven slide assumes an extreme starting position, and wherein the first guide curve of the driven slide is shaped such that when the driven slide starts to move away from its extreme starting position, the sloping curve part lifts the carrier drive pin, thus lifting the panel carrier and moving the first locking pin thereof out of a locking engagement with the first locking opening of the stationary guide part, whereas during a further movement of the driven slide the carrier drive pin reaches the orthogonal curve part.

As a result, the position of the panel carrier in the extreme starting position (open roof construction closed) is safeguarded in a reliable manner due to the engagement between the first locking pin and the first locking opening. When the carrier drive pin, however, has reached the orthogonal curve part, the driven slide moves the panel carrier along.

In yet another embodiment, the bracket is provided with a bracket drive pin and wherein the driven slide comprises a second guide curve for cooperation with the bracket guide pin. This in a simple manner assures the cooperation between the driven slide and the bracket.

Then it is preferred that the second guide curve of the driven slide is shaped such that it will engage the bracket drive pin in a manner for causing a sliding movement of the bracket drive pin relative to the stationary guide part only after the first locking pin of the panel carrier has been moved out of a locking engagement with the first locking opening of the stationary guide part.

In such an embodiment of the drive mechanism, it further may be provided with a locking lever having a first end pivotably attached to the bracket and an opposite second end carrying said bracket drive pin, wherein said locking lever further, near to its second end, is provided with a second locking pin whereas the stationary guide part is provided with a second locking opening with which the second locking pin is in a locking engagement in a starting position of the drive mechanism in which the driven slide assumes an extreme starting position, and wherein the second guide curve of the driven slide is shaped such that when the driven slide moves in a direction away from its extreme starting position, the second guide curve will engage the bracket drive pin for rotating the locking lever to a position in which the second locking pin is out of a locking engagement with the second locking opening.

This means that the locking lever is used both for locking the bracket in the extreme starting position (second locking pin engaging the second locking opening in the stationary guide part) and for driving the bracket (second locking pin out of engagement with the second locking opening and the second guide curve engaging the bracket drive pin on the locking lever).

In yet another embodiment, the stationary guide part is provided with a second guide channel comprising an intermediate channel part extending substantially in the moving direction of the driven slide and two opposite inclined channel end parts, of which one defines the second locking opening and of which the other defines a third locking opening in the stationary guide part, whereas the second guide curve of the driven slide comprises an intermediate curve part extending inclined to the intermediate channel part and, in transitional positions of the driven slide, partially overlapping it and two opposite curve end parts of which one, in a first intermediate position of the driven slide, coincides with the second locking opening and of which the other, in a second intermediate position of the driven slide, coincides with the third locking opening, and wherein the bracket drive pin is an elongation of the second locking pin.

In the extreme starting position the second locking pin is positioned in the second locking opening defined by the one channel end part and the bracket drive pin is free of the second guide curve. By moving the driven slide, the one curve end part of the second guide curve will come to coincide with that second locking opening while receiving and engaging the bracket drive pin (first intermediate position of the driven slide) and the combination of bracket drive pin and second locking pin will start to move. In transitional positions of the driven slide the bracket drive pin will remain in the intermediate curve part while the second locking pin moves along the intermediate channel part. In the second intermediate position of the driven slide the second locking pin will enter the third locking opening which is defined in the other channel end part. At the same time the bracket drive pin has reached the other curve end part and will leave the second guide curve. As a result the bracket will remain in said position which is defined by the cooperation between the second locking pin on the locking lever and the third locking opening in the stationary guide part, while the driven slide may move further taking along the panel carrier (of which the carrier drive pin is engaged by the orthogonal curve part of the first guide curve of the driven slide). The bracket drive pin will leave the other curve end part now. Finally the driven slide (and panel carrier) will reach an extreme end position (open roof construction fully open).

It is noted that in an alternative embodiment in which the bracket drive pin is staggered relative to the second locking pin, a corresponding relative staggering would be needed with respect to the second guide channel (and its components) and the second guide curve (and its components) to achieve a similar result as described above.

It is conceivable that the lifting unit is connected to a drive lever which is operable by the driven slide, wherein the driven slide and the stationary guide part comprise guides cooperating with corresponding tabs on the drive lever in such a manner that the driven slide when moving from an extreme starting position initially moves the drive lever along, wherein after the driven slide has moved over a certain distance the drive lever is disengaged from the driven slide and remains in a stationary position. Such a construction may, for example, be devised in accordance with the state of the art according to EP-A-2.607.125.

The invention secondly relates to an open roof construction for a vehicle, comprising a roof opening in a stationary roof part, wherein at two opposite sides of said roof opening there are provided two moving mechanisms, and wherein the panel carriers of said moving mechanisms carry a roof panel for opening and closing said roof opening.

BRIEF DESCRIPTION OF THE DRAWINGS

Hereinafter the invention will be elucidated while referring to the drawings, in which:

FIGS. 2-6 show successive stages during the operation of the drive mechanism in a schematic side elevational view;

DETAILED DESCRIPTION OF THE ILLUSTRATIVE EMBODIMENTS

Figure 1:
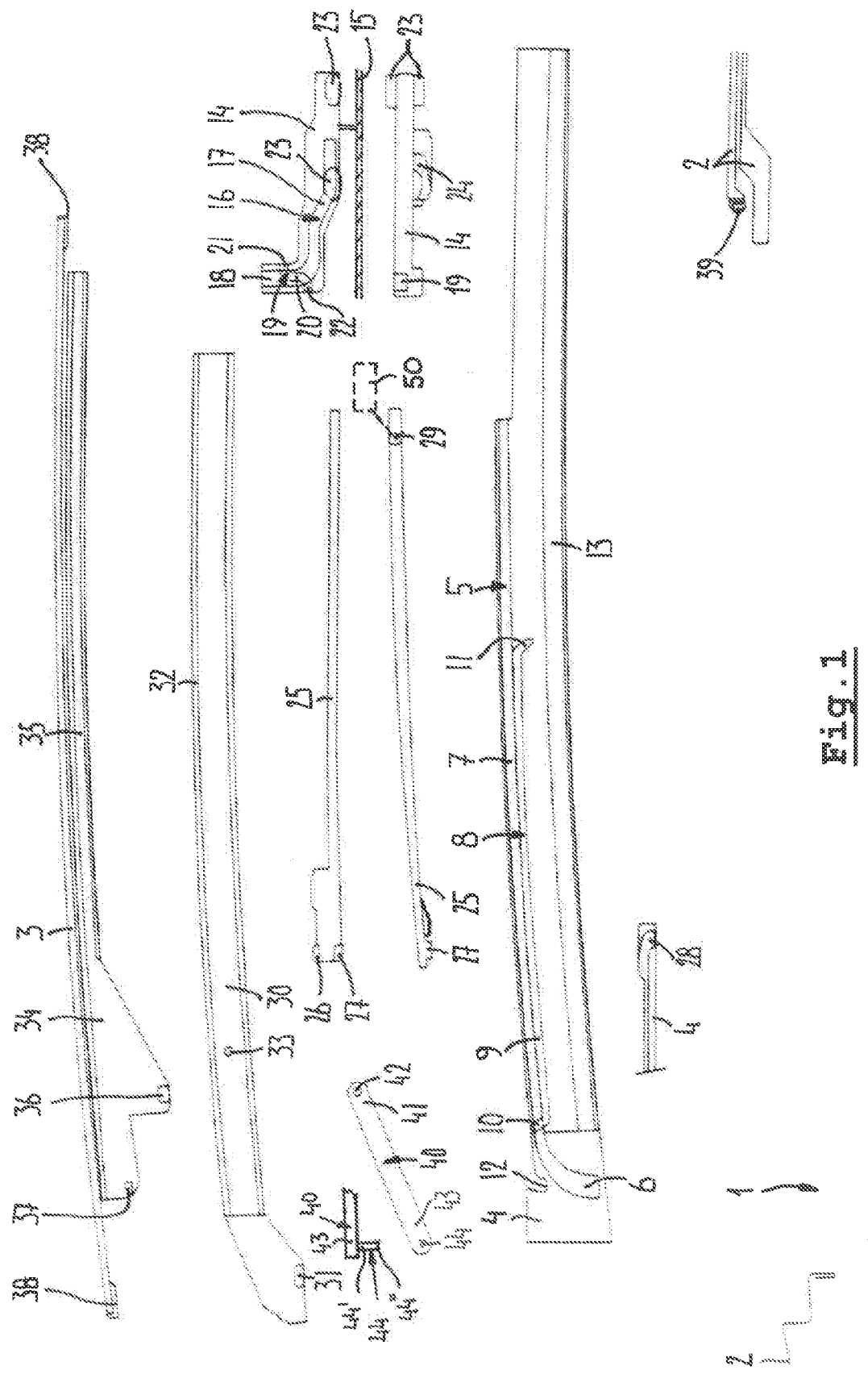
FIG. 1 in an explosive view illustrates the constitutive parts or components of a drive mechanism.
Figure 4:
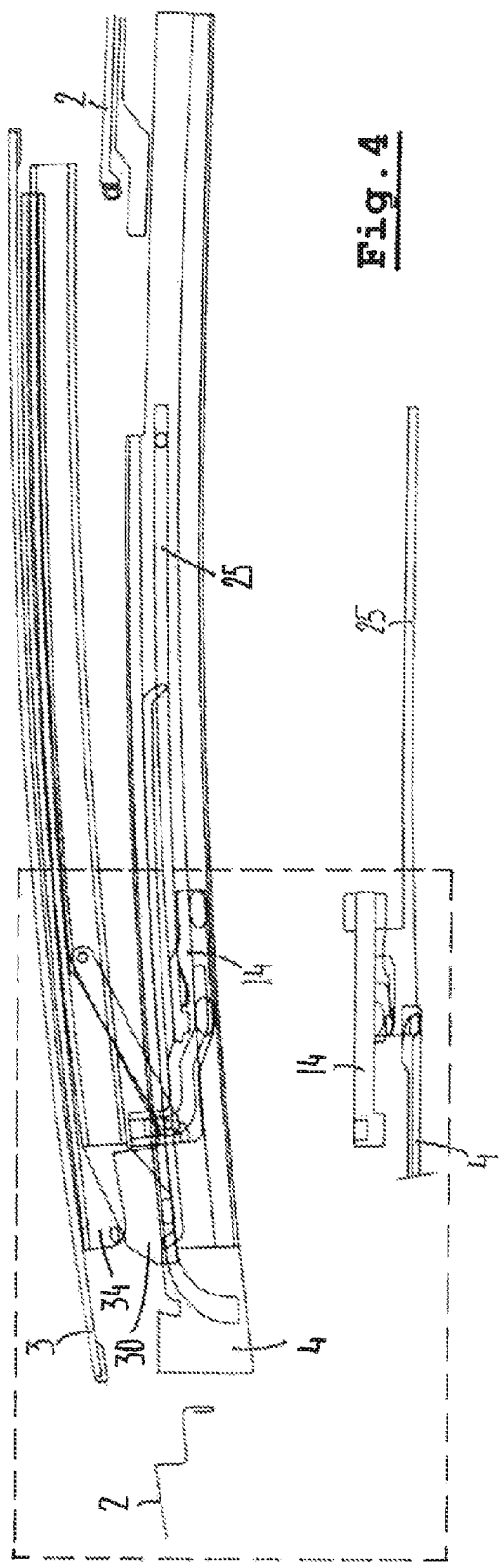
Figure 5:
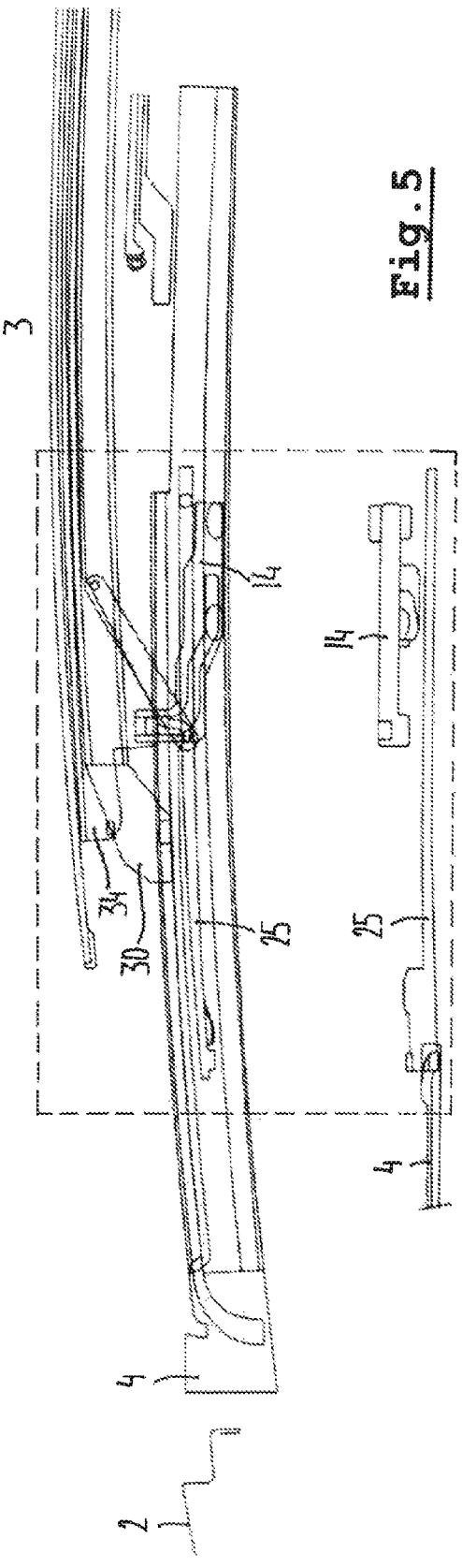
Figure 6:
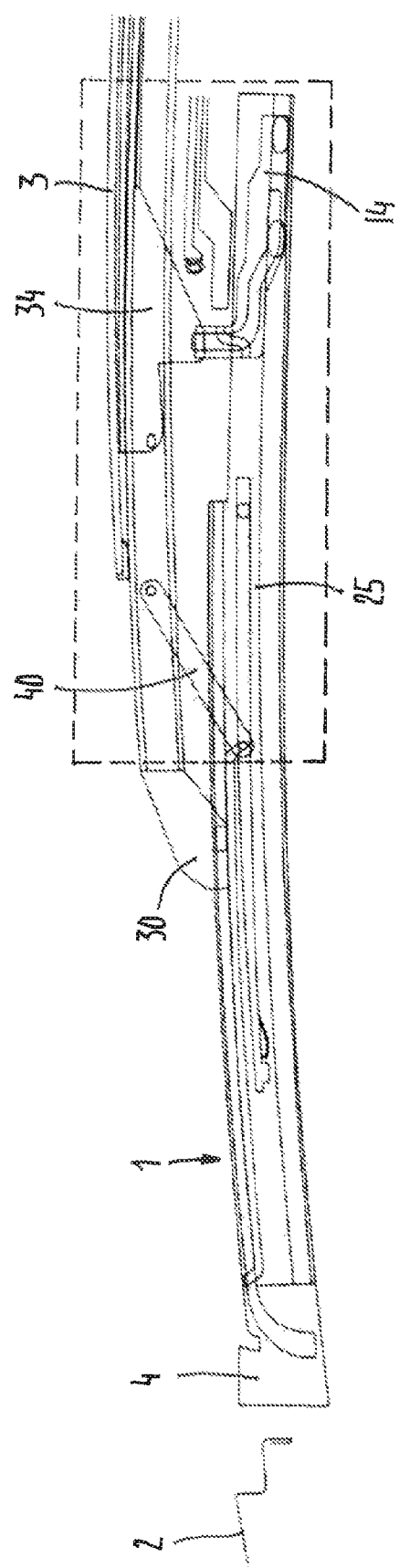

The drive mechanism is illustrated in an embodiment intended for use with an open roof construction for a vehicle, comprising a roof opening 1 in a stationary roof part 2 and a movable roof panel 3 for closing and opening said roof opening. Referring to FIG. 1, the drive mechanism comprises the following parts or components:

a stationary guide part 4 which will have a stationary position in the vehicle. This stationary guide part 4 is provided with a first guide channel 5 comprising a sloping channel part 6 gradually merging into a longitudinal channel part 7, and a second guide channel 8 comprising an intermediate channel part 9 merging into two opposite inclined channel end parts 10,11 which (as will appear later) define respective second and third locking openings. Preferably the longitudinal channel part 7 and the intermediate channel part 9 will extend substantially in parallel. The stationary guide part 4 further is provided with a first locking opening 12. Near its bottom the stationary guide part is provided with one or a number of guide ways 13;

a driven slide 14, for example driven by a cable 15 or other drive mechanism, and provided with a first guide curve 16 comprising a sloping curve part 17 and an orthogonal curve part 18 connected thereto, and a second guide curve 19 comprising an intermediate curve part 20 merging into two opposite (upper and lower) curve end parts 21,22. The driven slide 14 further comprises slide shoes 23 using which the driven slide 14 will slide along the guide way (or guide ways) 13 of the stationary guide part 4 when driven by the drive cable 15. The shape and position of the second guide curve 19 is such that in a first intermediate position of the driven slide 14 (to be shown in and described below with reference to FIGS. 3 and 8) the upper curve end part 21 will coincide with the channel end part or second locking opening 10, whereas in a second intermediate position of the driven slide 14 (to be shown in and described below with reference to FIGS. 5 and 10) the lower curve end part 22 will coincide with the channel end part or third locking opening 11. In a transitional position of the driven slide 14 between these two intermediate positions (to be shown in and described below with reference to FIGS. 4 and 9) the intermediate curve part 20 will extend inclined to the intermediate channel part 9 and will partially overlap latter. It is noted that the driven slide 14 is shown in a side elevational view (top) and a top view (bottom) in FIG. 1. In the bottom view a guide 24 is visible which extends in a sideward direction from the driven slide 14;

a drive lever 25 (shown in a top plan view —top— and a side elevational view —bottom— in FIG. 1) comprising tabs 26 and 27. Tab 26 is meant for cooperation with guide 24 of the driven slide 14, whereas tab 27 is meant for cooperation with a guide 28 of the stationary guide part 4 (illustrated in a partial top plan view of the stationary guide part 4 at the bottom of FIG. 1) in a manner as basically described in EP-A-2.607.125, for driving a lifting unit 50 which at a connection 29 will be connected to the drive lever 25;

a bracket 30 having a forward end carrying a guide shoe 31 and provided with a guide flange or flanges 32 and a pivot 33. The guide shoe 31 will be positioned in the first guide channel 5 of the stationary guide part 4. A rearward end of the bracket (opposite to the forward end) will be engaged by the above-mentioned lifting unit in such a manner that the lifting unit can lift or lower said rearward end and that the bracket can slide relative to the lifting unit;

a panel carrier 34 carrying the roof panel 3 (for example a glass panel) and provided with guide grooves 35 for a sliding cooperation with the guide flange or flanges 32 of the bracket 30. The panel carrier 34 further is provided with a carrier drive pin 36 to be received in the first guide curve 16 of the driven slide 14 and a first locking pin 37 which is meant for cooperation with the first locking opening 12 in the stationary guide part 4. The roof panel 3 (or, in a different embodiment not illustrated, the panel carrier 34) finally is provided with an encapsulation 38 for a sealing cooperation with the surrounding edges of the roof opening 2 (which additionally may be provided with sealing members 39 as illustrated at the right bottom in FIG. 1);

a locking lever 40 (illustrated in a side elevational view —bottom— and a partial top plan view —top— in FIG. 1) having a first end 41 which at a pivot 42 will be pivotably connected to pivot 33 of the bracket 30 and which at the opposite second end 43 carries a bracket drive pin 44 and a second locking pin 44' which in the illustrated embodiment are combined into a combined drive/locking pin 44, and of which the bracket drive pin part is meant for cooperation with the second guide curve 19 of the driven slide 4 and of which the second locking pin part is meant for cooperation with the second guide channel 8, as will appear below.

The following description of the operation of the drive mechanism that is obtained after assembling the separate parts or component shown in FIG. 1, basically will refer to FIGS. 7-11. Following such a description the FIGS. 2-6 will be clear without needing a further detailed description or the provision therein of all of the reference signs (FIGS. 2-6 basically are meant for showing a general total impression of the driving mechanism in different positions in relation to the stationary roof part 2, whereas in at least some of the detailed representations according to FIGS. 7-11 the stationary roof 2 is not or only partly visible). The figures all show an embodiment in which the left side corresponds with the forward direction of the vehicle.

Figure 7:
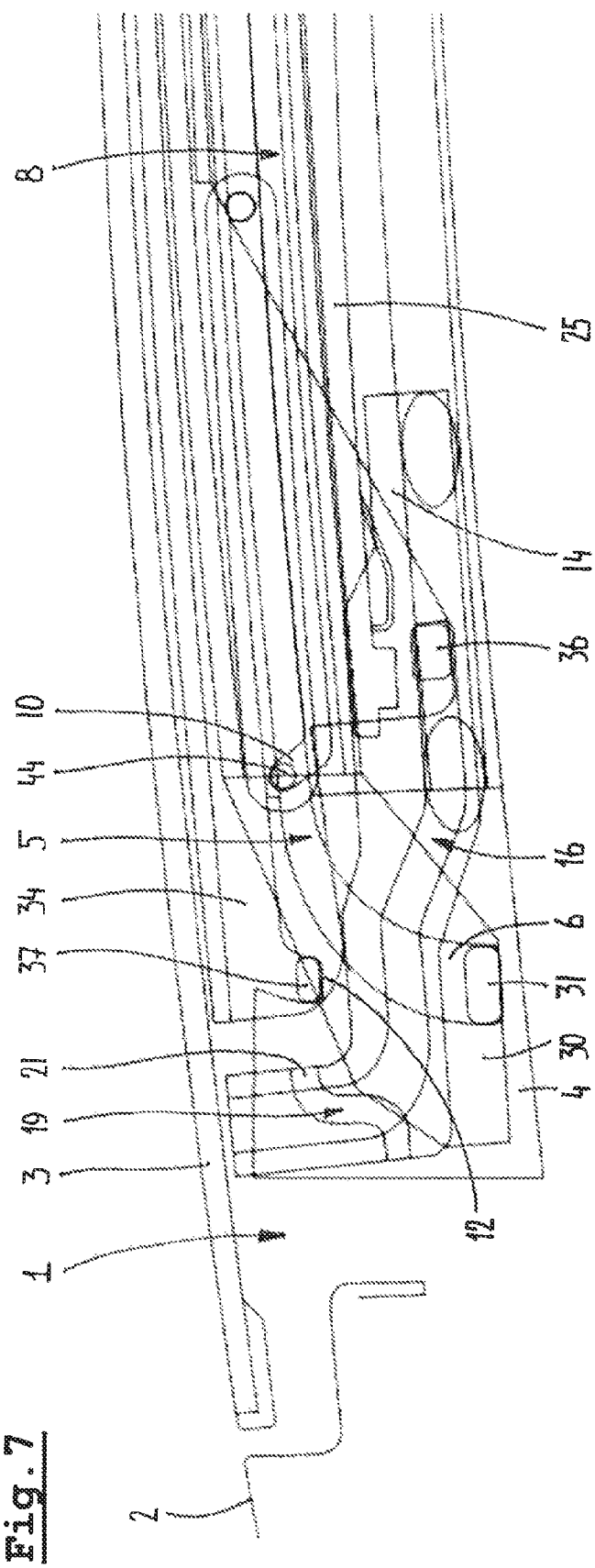
FIGS. 7-11 show enlarged views of the sectors indicated by dotted lines in the FIGS. 2-6, and FIG. 12 explains some used terminology.

Firstly referring to FIG. 7 (and FIG. 2), the extreme starting position is illustrated in which the driven slide 14 is in its foremost position and the roof panel 3 completely closes the roof opening 1. The carrier drive pin 36 of the panel carrier 34 is located in the lowermost part of the first guide curve 16 of the driven slide 14, and the first locking pin 37 of the panel carrier 34 engages the first locking opening 12 in the stationary guide part 4. The guide shoe 31 of the bracket 30 is positioned in the lowermost part of the sloping channel part 6 of the first guide channel 5 in the stationary guide part 4. The drive lever 25 assumes a position in which the second locking pin part of the combined drive/locking pin 44 is received in the channel end part or second locking opening 10 of the second guide channel 8 in the stationary guide part 4. Although not shown in detail, in this position the tab 26 of the drive lever 25 is engaged by the guide 24 of the driven slide 14 for a movement therewith.

In this position the bracket 30 and panel carrier 34 with roof panel 3 are securely locked and maintained in the illustrated position in which the roof opening 1 is closed.

Figure 8:
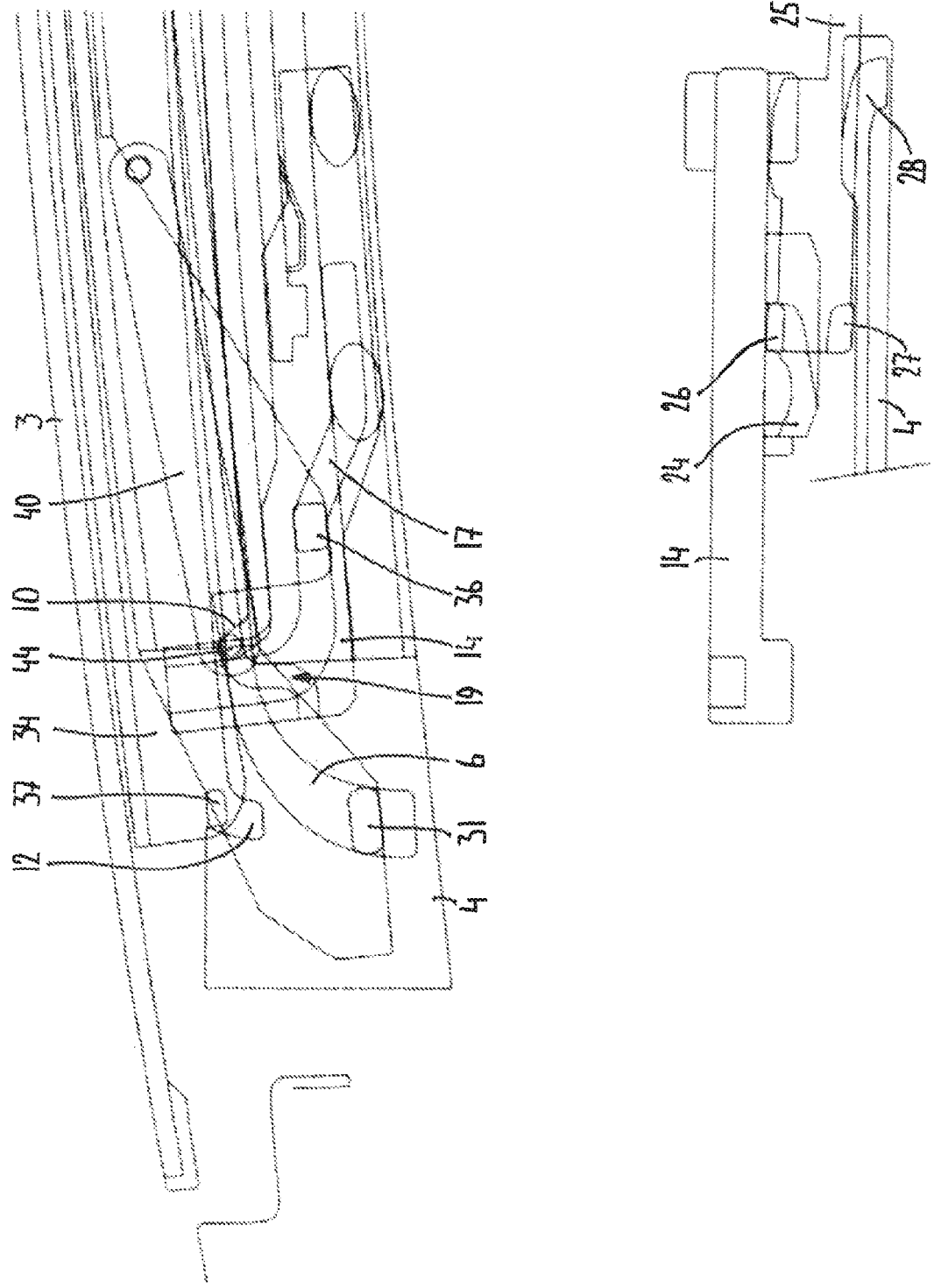

In FIG. 8 (and FIG. 3) the driven slide 14 by means of its drive mechanism (for example the drive cable 15 illustrated in FIG. 1) has been moved backwards (to the right) to a first intermediate position. Because of the cooperation between the guide shoe 31 and the sloping channel part 6, the panel carrier 34 initially will not follow such a backward movement. The same applies for the carrier 34 because of the locking co-operation between the first locking pin 37 and the first locking opening 12. However, when the driven slide 14 has moved over a certain distance, the sloping curve part 17 will start to raise the carrier drive pin 36, thus lifting the panel carrier 34 and moving the first locking pin 37 in an upward direction out of a locking engagement with the first locking opening 12, reaching the situation illustrated in FIG. 8. At this moment the upper curve end part 21 of the second guide curve 19 of the driven slide 14 (best visible in FIG. 7) has reached a position in which it coincides with the channel end part 10 for receiving the bracket drive pin part of the combined drive/locking pin 44.

As shown in the bottom part of FIG. 8, the drive lever 25 is still connected to the driven slide 14 through the engagement between the tab 26 and guide 24, as a result of which the drive lever 25 also moves to the rear (to the right in the figure) for activating a rear lifting unit 50 which, in a manner known per se, lifts the rearward end of the combination of bracket 30 and panel carrier 34 with roof panel 3.

Starting from the position illustrated in FIG. 8, a further rearward movement of the driven slide 14 will cause the second guide curve 19 (and especially its intermediate curve part 20) to engage the bracket drive pin part of the combined drive/locking pin 44 for moving it downward in the channel end part 10 and into the intermediate channel part 9 of the second guide channel 8 in the stationary guide part 4. Because the intermediate curve part 20 and the intermediate channel part 9 partially are mutually inclined and overlap each other (meaning that they do not extend in line nor in parallel, but intersect), the second locking pin part of the combined drive/locking pin 44 only can move along with the driven slide 14 through the intermediate channel part 9 and thus, through the locking lever 40, taking along the bracket 30, of which the guide shoe 31 meanwhile has reached the longitudinal channel part 7 and will slide therein. In the mean time the carrier drive pin 36 has reached the upper end of the orthogonal curve part 18 of the first guide curve 16 of the driven slide 14, such that the panel carrier 34 also will move along with the driven slide 14.

As a result the driven slide 14 moves both the bracket 30 and the panel carrier 34 (with roof panel 3) to the rear, as well as the drive lever 25 for activating the lifting unit.

Figure 9:
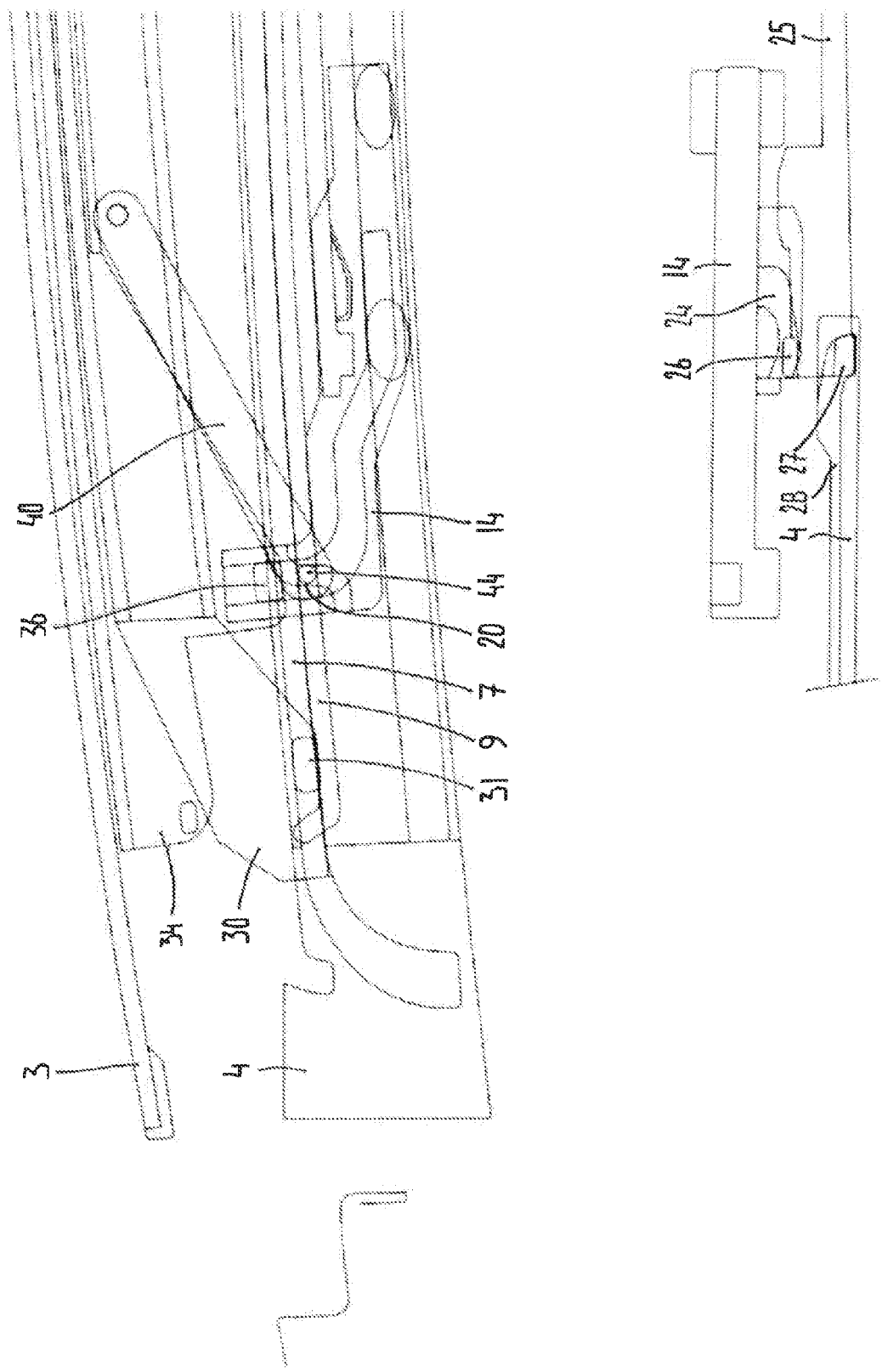

FIG. 9 (FIG. 4) shows a transitional position in which still (as described in the previous paragraph) the bracket 30 and panel carrier 34 move along with the driven slide 14, but in which the tab 27 of the drive lever 25 has entered guide 28 of the stationary guide part 4 and is about to leave and disengage the guide 24 of the driven slide 14. This marks the end of the movement of the drive lever 25 and corresponds with the final (totally lifted) position of the lifting unit. A further rearward movement of the driven slide 14 will now occur without the drive lever 25.

Figure 10:
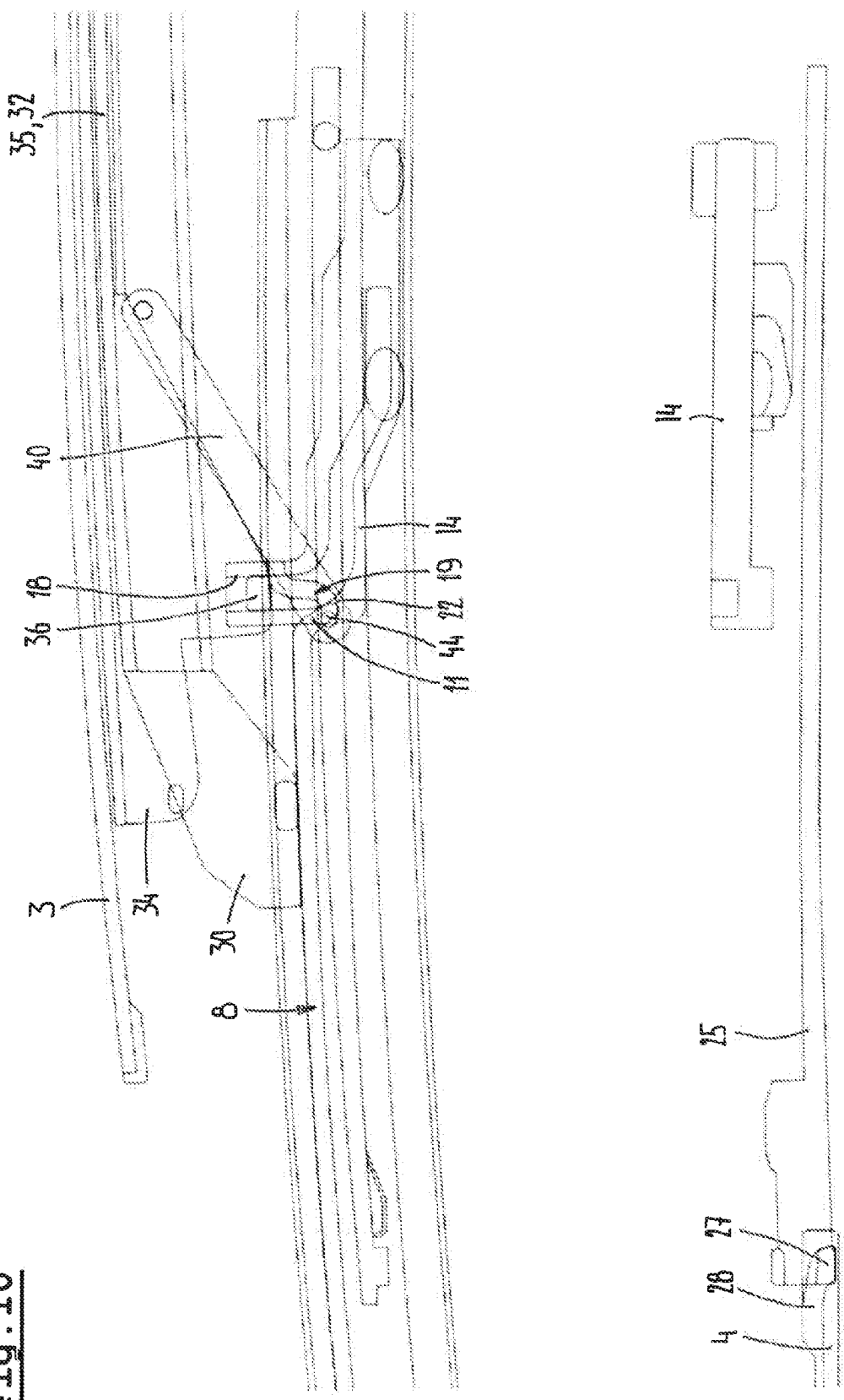

When a second intermediate position according to FIG. 10 (FIG. 5) is reached, the second locking pin part of the combined drive/locking pin 44 reaches the channel end part 11 of the second guide channel 8 in the stationary guide part 4 and will enter it while the bracket drive pin part of the combined drive/locking pin 44 moves into the lower curve end part 22 of the second guide curve 19 in the driven slide 14. Once the second locking pin part of the combined drive/locking pin 44 has reached said channel end part 11 (which will act as a third locking opening) the locking lever 40 will stop moving along with the driven slide 14 and the bracket drive pin part of the combined drive/locking pin 44 will move out of the lower curve end part 22. The bracket 30 thus will remain in this position as defined by the cooperation between the channel end part or third locking opening 11 and the second locking pin part of the combined drive/locking pin 44 on the second end 43 of the locking lever 40. Thus, starting from the position illustrated in FIG. 10, the bracket 30 stops moving, but the panel carrier 34 (with roof panel 3) will move further together with the driven slide 14 relative to the bracket 30 as a result of the continued engagement between the carrier drive pin 36 of the panel carrier 34 and the orthogonal curve part 18 of the driven slide 14, as allowed by the sliding engagement between the guide flange(s) 32 of the bracket 30 and the guide flange(s) 35 of the panel carrier 34.

In the bottom part of FIG. 10 it is shown that the driven slide 14 has moved further to the rear, whereas the drive lever 25 with its tab 27 is kept stationary in the guide 28 of the stationary guide part 4.

Figure 11:
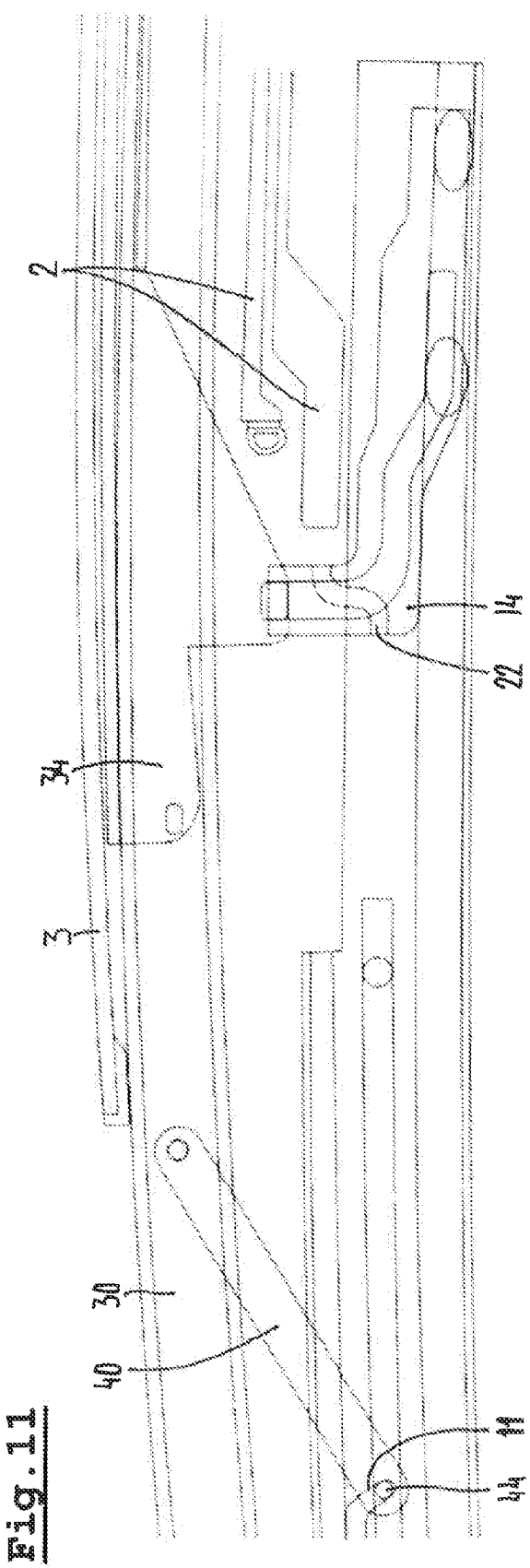

Finally, FIG. 11 (and FIG. 6) shows an end position of the driven slide 14 in which it has reached its rearmost position. The panel carrier 34 with roof panel 3 has been moved relative to the now stationary bracket 30 to its extreme open position for maximally freeing the roof opening 1.

Figure 12:
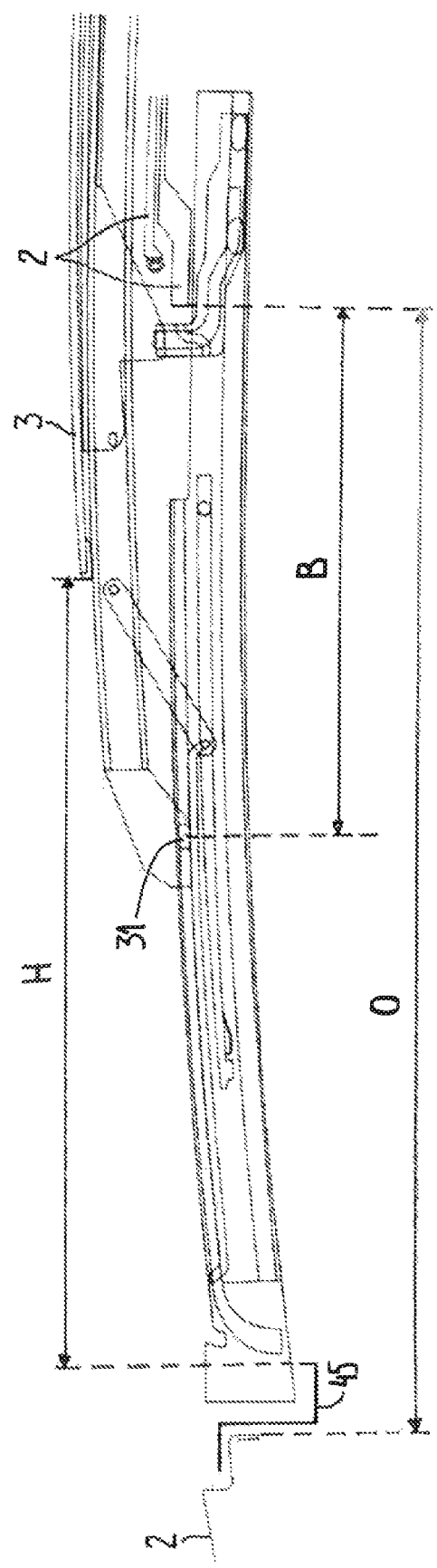

FIG. 12 explains some terminology used with reference to the present invention. Distance O is the longitudinal dimension of the roof opening (or aperture) 1, distance H represents the so-called hands-through opening (between a sunroof frame 45 and the foremost edge of the roof panel 3) and distance B is the so-called base length which, in accordance with the present invention, may be increased (for increasing the stability of the roof panel), while at the same time increasing the hands-through opening H.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

What is claimed is:

1. A drive mechanism for an open roof construction for a vehicle, comprising:
   a stationary guide part defining a first guide channel;
   a bracket having a forward end and a rearward end, wherein the forward end of the bracket is provided with a guide shoe cooperating with the first guide channel in a manner that the bracket slides and rotates relative to the stationary guide part;
   a lifting unit positioned at a stationary position for cooperation with the rearward end of the bracket in a manner to lift or lower said rearward end and to allow a sliding movement of the bracket relative to the lifting unit;
   a driven slide movable in a moving direction relative to the stationary guide part and which at one hand is configured to move the guide shoe of the bracket along the first guide channel and which at the other hand is configured to drive the lifting unit to lift and lower the rearward end of the bracket;
   a panel carrier which is supported by the bracket and which carries out a sliding movement relative thereto in a direction substantially corresponding with the direction of the sliding movement of the bracket relative to the stationary guide part, wherein the driven slide further is configured to cause the sliding movement of the panel carrier relative to the bracket.

2. The drive mechanism according to claim 1, wherein the panel carrier is provided with a carrier drive pin and wherein the driven slide comprises a first guide curve configured to cooperate with the carrier drive pin.

3. The drive mechanism according to claim 2, wherein the first guide curve of the driven slide comprises at least a sloping curve part sloping relative to the direction of the sliding movement of the panel carrier and at least an orthogonal curve part extending substantially orthogonally to the direction of the sliding movement of the panel carrier, whereas the first guide channel comprises a sloping channel part and a longitudinal channel part extending substantially in the moving direction of the driven slide, wherein the arrangement is such that when the carrier drive pin moves along the sloping curve part, the guide shoe moves along the sloping channel part and when the guide shoe has reached the longitudinal channel part, the carrier drive pin has reached the orthogonal curve part.

4. The drive mechanism according to claim 3, wherein the panel carrier is provided with a first locking pin and wherein the stationary guide part is provided with a first locking opening with which the first locking pin is in a locking engagement in a starting position of the drive mechanism in which the driven slide assumes an extreme starting position, and wherein the first guide curve of the driven slide is shaped such that when the driven slide starts to move away from its extreme starting position, the sloping curve part lifts the carrier drive pin, thus lifting the panel carrier and moving the first locking pin thereof out of a locking engagement with the first locking opening of the stationary guide part, whereas during a further movement of the driven slide the carrier drive pin reaches the orthogonal curve part.

5. The drive mechanism according to claim 1, wherein the a locking lever is provided with a bracket drive pin and wherein the driven slide comprises a second guide curve configured to cooperate with the bracket guide pin.

6. The drive mechanism in accordance with claim 5, wherein the second guide curve of the driven slide is shaped such that the driven slide will engage the bracket drive pin in a manner to cause a sliding movement of the bracket drive pin relative to the stationary guide part only after the first locking pin of the panel carrier has been moved out of a locking engagement with the first locking opening of the stationary guide part.

7. The drive mechanism according to claim 6, further provided with a locking lever having a first end pivotably attached to the bracket and an opposite second end carrying said bracket drive pin, wherein said locking lever further, near to the second end, is provided with a second locking pin whereas the stationary guide part is provided with a second locking opening with which the second locking pin is in a locking engagement in a starting position of the drive mechanism in which the driven slide assumes an extreme starting position, and wherein the second guide curve of the driven slide is shaped such that when the driven slide moves in a direction away from its extreme starting position, the second guide curve will engage the bracket drive pin to rotate the locking lever to a position in which the second locking pin is out of a locking engagement with the second locking opening.

8. The drive mechanism according to claim 7, wherein the stationary guide part is provided with a second guide channel comprising an intermediate channel part extending substantially in the moving direction of the driven slide and two opposite inclined channel end parts, of which one defines the second locking opening and of which the other defines a third locking opening in the stationary guide part, whereas the second guide curve of the driven slide comprises an intermediate curve part extending inclined to the intermediate channel part and, in transitional positions of the driven slide, partially overlapping it and two opposite curve end parts of which one, in a first intermediate position of the driven slide, coincides with the second locking opening and of which the other, in a second intermediate position of the driven slide, coincides with the third locking opening and wherein the bracket drive pin is an elongation of the second locking pin.

9. The drive mechanism according to claim 1, wherein the lifting unit is connected to a drive lever which is operable by the driven slide, wherein the driven slide and the stationary guide part comprise guides cooperating with corresponding tabs on the drive lever in such a manner that the driven slide when moving from an extreme starting position initially moves the drive lever along, wherein after the driven slide has moved over a certain distance the drive lever is disengaged from the driven slide and remains in a stationary position.

10. An open roof construction for a vehicle, comprising a roof opening in a stationary roof part, wherein at two opposite sides of said roof opening there are provided two moving mechanisms, each drive mechanism comprising:
   a stationary guide part defining a first guide channel;
   a bracket having a forward end and a rearward end, wherein the forward end of the bracket is provided with a guide shoe cooperating with the first guide channel in a manner that the bracket slides and rotates relative to the stationary guide part;
   a lifting unit positioned at a stationary position for cooperation with the rearward end of the bracket in a manner to lift or lower said rearward end and to allow a sliding movement of the bracket relative to the lifting unit;
   a driven slide movable in a moving direction relative to the stationary guide part and which at one hand is configured to move the guide shoe of the bracket along the first guide channel and which at the other hand is configured to drive the lifting unit to lift and lower the rearward end of the bracket;
   a panel carrier which is supported by the bracket and which carries out a sliding movement relative thereto in a direction substantially corresponding with the direction of the sliding movement of the bracket relative to the stationary guide part, wherein the driven slide further is configured to cause the sliding movement of the panel carrier relative to the bracket; and
   a roof panel connected to each of the panel carriers and configured to open and close said roof opening.

* * * * *